US006465993B1

(12) United States Patent
Clarkin et al.

(10) Patent No.: US 6,465,993 B1
(45) Date of Patent: Oct. 15, 2002

(54) VOLTAGE REGULATION EMPLOYING A COMPOSITE FEEDBACK SIGNAL

(76) Inventors: John Clarkin, 569 Williams Crossing Rd., Coventry, RI (US) 02816; Dimitry Goder, 2451 Paseo Del Oro, San Jose, CA (US) 95124; George Schuellein, 40 Birchwood Dr., Narragansett, RI (US) 02882

( * ) Notice: Subject to any disclaimer, the term of this patent is extended or adjusted under 35 U.S.C. 154(b) by 0 days.

(21) Appl. No.: 09/431,024

(22) Filed: Nov. 1, 1999

(51) Int. Cl.[7] .............................................. G05F 1/40
(52) U.S. Cl. ..................................................... 323/272
(58) Field of Search ................................ 323/265, 268, 323/273, 274, 275, 277, 282, 284, 285, 290, 225

(56) References Cited

U.S. PATENT DOCUMENTS

| | | | |
|---|---|---|---|
| 3,641,422 A | 2/1972 | Farnsworth et al. | 323/8 |
| 4,293,812 A | 10/1981 | Kubach et al. | 323/272 |
| 4,629,971 A | 12/1986 | Kirk | 323/289 |
| 4,885,674 A | 12/1989 | Varga et al. | 363/21 |
| 4,928,200 A | 5/1990 | Redl et al. | 361/93 |
| 4,975,820 A | 12/1990 | Szepesi | 363/21 |
| 4,985,821 A | 1/1991 | Cohen | 363/95 |
| 5,029,269 A | 7/1991 | Elliott et al. | 363/21 |
| 5,164,890 A | 11/1992 | Nakagawa et al. | 363/65 |
| 5,465,201 A | 11/1995 | Cohen | 363/21 |
| 5,731,731 A * | 3/1998 | Wilcox et al. | 327/403 |
| 5,770,940 A | 6/1998 | Goder | 323/282 |
| 5,808,453 A * | 9/1998 | Lee et al. | 323/224 |
| 5,912,552 A * | 6/1999 | Tateishi | 323/285 |
| 5,973,485 A * | 10/1999 | Kates et al. | 323/272 |
| 5,994,885 A * | 11/1999 | Wilcox et al. | 323/285 |

OTHER PUBLICATIONS

Zhou, X., et al., "A High Power Density, High Efficiency and Fast Transient Voltage Regulator Module with a Novel Current Sensing and Current Sharing Technique", *IEEE*, Jun. 1999, pp. 289–294.

\* cited by examiner

*Primary Examiner*—Peter S. Wong
*Assistant Examiner*—Gary L. Laxton

(57) ABSTRACT

A switching power supply produces a regulated output voltage. An output inductor is connected at one end to a power switch circuit having a duty cycle. The other end of the output inductor has a regulated output voltage. A voltage feedback circuit produces a voltage feedback signal representative of the regulated output voltage. A current feedback circuit produces a composite signal representative of inductor current, the composite signal having an ac component and a dc component. An error amplifier produces an error signal representative of the difference between a reference voltage and the voltage feedback signal. A pulse width modulator comparator compares the error signal to a composite signal representing a summing of the voltage feedback signal with a current sensing signal representative of output inductor current, the composite signal having an ac component and a dc component. The comparator output results in a gate drive signal that controls the duty cycle of the power switch circuit to maintain the regulated output voltage.

25 Claims, 11 Drawing Sheets

VOLTAGE REGULATION EMPLOYING A COMPOSITE FEEDBACK SIGNAL

TECHNICAL FIELD

The present invention relates to switching power supplies, and in particular, to the switch control circuitry in a switching power supply.

BACKGROUND ART

Low-voltage, high-speed computer processors present an array of complex power supply design challenges including multiple voltages, high currents, precise regulation, low noise, fast response, tight space, and cost constraints. For example, the core of a 300 MHz Intel Pentium® II processor draws up to 14.2A at a typical voltage of 2.8v, and can generate current transients of up to 13A at 30A/μsec. Future processors are likely to produce even higher rates of current consumption and even more severe load transients. Maintaining desirable regulation under such high current loads and such wide load swings pushes beyond the practical limits of conventional linear regulators. Their efficiency is too low, producing excessive heat, and requiring costly power dissipation hardware. Consequently, the trend for such applications has been to use DC—DC switching regulators, or converters, e.g., synchronous and nonsynchronous buck converters.

A buck converter works by varying the duty cycle of the power MOSFET switch it drives. For example, in a synchronous topology as shown in FIG. 1(a), switch Q1 turns on at the start of each switching cycle. A voltage equal to the supply voltage less the output voltage appears across the inductor, L. The resulting inductor current climbs and flows through the load as long as the switch Q1 is closed. The current ramp is approximated by:

$$\Delta I_{ON} = [t_{ON} \times \Delta V]/L$$

where $\Delta I_{ON}$ is the current through the inductor, $t_{ON}$ is the switch on time, $\Delta V$ is the voltage across the inductor, and L is the inductance. When Q1 is off, Q2, the synchronous rectification transistor, turns on and energy stored in the inductor L generates current through Q2 and the load. The output voltage appears across the inductor, causing a current ramp approximated by:

$$\Delta I_{OFF} = [t_{OFF} \times V_{OUT}]/L$$

During each switching cycle, the inductor's steady-state current ramps between maximum and minimum values, yielding an average current of:

$$I_{DC} = (I_{MAX} + I_{MIN})/2$$

Because $\Delta I_{ON} = \Delta I_{OFF}$, $$T_{ON} \times (V_{IN} - V_{OUT}) = T_{OFF} \times V_{OUT}$$

Thus, the volt-second product is the same during the power switch's on and off times. However, because the average inductor current equals the load current, inductor ripple current can flow through the load to ground during the power switch's off time, degrading efficiency. This is not the case for a nonsynchronous buck converter, as shown in FIG. 1(b), which replaces Q2 with a diode.

Input voltage and output voltage are related to duty cycle, which is the ratio of the power switch's on time over the total switching period:

$$\text{Duty Cycle} = V_{OUT}/V_{IN}$$

Duty cycle is a function of the input and output voltages, and is independent of the load. In practice, under heavy loads, voltage across the inductor is reduced by resistive losses in the two MOSFET switches, circuit board traces, and the inductor itself. In addition, input voltage tends to drop with increased load. These loading losses can cause duty cycle to vary by 25% or more.

Compared to linear regulators, buck converters, because of their switching inductance, have an inherently slower output current slew rate. However, a converter's finite transient response time can be enhanced by bulk output capacitance, improving overall response to instantaneous load changes. The minimum theoretical transient response is given by:

$$t_{RESPONSE} = (\Delta I \times L)/\Delta V$$

where $\Delta I$ is the change load current, $\Delta V$ is the voltage across the inductor, and L is the inductance. For example, if $V_{IN}$=5v, $V_{OUT}$=2.8v, and L=2 μH, and load changes from 0.5A to 13A, the minimum transient response time is 11.4 μs.

However, the duty cycle control loops of conventional buck converters tend to operate at relatively low frequencies, and, therefore, theoretical minimum transient response times are not approached. Typically, the linear loops adjust to load changes over hundreds of microseconds and many switching cycles. To meet the fast response time of modern computer processors, such buck converter circuits require many costly, low equivalent series resistance (ESR) capacitors. A review of the most common control schemes illustrates the problem.

Of the three common control methods for buck converters—voltage mode, current mode, and ripple regulation—voltage mode control, shown in FIG. 2, is widely favored for its simple feedback loop. An error amplifier compares the regulator output voltage to a reference voltage, and generates a control voltage which drives one input of a comparator. The other input to the comparator is connected to a sawtooth wave generator oscillator. The comparator and its inputs serve as a pulse-width modulator (PWM) circuit that controls the MOSFET switch on-time and, therefore, its duty cycle and output voltage.

At the start of each switching cycle, with the MOSFET switched on, the sawtooth voltage ramps upward from its minimum level. When the sawtooth reaches the error amplifier output voltage level, the comparator turns off the MOSFET. This method of control requires that the error amplifier adjust its output voltage in response to line and load changes. Changes in the control voltage pass through the error amplifier and cause corresponding changes in the output voltage. For DC accuracy and stability, voltage mode control requires the control loop to have a relatively high gain and low frequency response, thereby limiting transient response.

Current mode control, shown in FIG. 3, employs dual feedback loops and offers improved line regulation. As with voltage control, this technique uses an error amplifier to generate a PWM control voltage. However, the current through the inductor becomes the source of the PWM sawtooth waveform. Because changes in input voltage immediately affect the slope of the inductor ramp current, duty cycle is inherently adjusted without requiring a change in the error amplifier output. Changes in the load, however, do not affect inductor current or the PWM ramp. Consequently, as with voltage mode control, load regulation requires changes in the error amplifier output voltage. Also, current mode control needs an accurate (and often bulky and costly) current sense resistor to produce a stable PWM ramp voltage, thereby reducing efficiency.

Ripple regulation, shown in FIG. 4, uses output voltage ripple as the PWM sawtooth which is fed to the PWM comparator. The control signal at the other comparator input is a fixed voltage. As a result, ripple regulation requires no error amplifier and achieves a fast response without the need for loop compensation. The MOSFET duty cycle adjusts quickly, pulse by pulse. Changes in line current immediately affect the inductor current and correct the output voltage. Changes in load correct the output directly. The design is simple and its component count low. The main drawback of ripple regulation, however, is that it controls the peak output ripple voltage. Thus, DC accuracy is determined by the mean output ripple voltage, and, as a result, regulation suffers. Related regulation problems include increased output voltage caused by PWM comparator and switch delays, as well as output voltage decreases caused by aging output capacitors.

A fourth method of buck converter control—$V^{2TM}$ control—combines the simple, fast response, and low component count of ripple regulation with the DC accuracy of voltage mode control. The $V^{2TM}$ method, shown in FIG. 5, adds an error amplifier to the ripple regulator topology, resulting in dual feedback loops as in current mode control. The output voltage generates both the ramp signal and the error signal. The $V^{2TM}$ method of control uses a ramp signal generated by the ESR of the output capacitors. This ramp is proportional to the AC current in the inductor and is offset by the DC output voltage. $V^{2TM}$ inherently compensates for variation in both line and load conditions since the ramp signal is generated from the output voltage. This differs from traditional methods such as voltage mode control, where an artificial ramp signal must be generated, and current mode control, where a ramp is generated from inductor current.

The ramp signal also contains the DC portion of the output voltage, allowing the control circuit to drive the output switch from 0% to about 90% duty cycle. Changes in line voltage will change the current ramp in the inductor, affecting the ramp signal and causing the $V^{2TM}$ control loop to adjust the duty cycle. Since a change in inductor current changes the ramp signal, the $V^{2TM}$ method has the characteristics and advantages of current mode control for line transient response. Changes in load current will affect the output voltage and thus will also change the ramp signal. A load step will immediately change the state of the comparator output that controls the output switch. In this case, the comparator response time and the transition speed of the switch limit load transient response time. The reaction time of the $V^{2TM}$ loop to a load transient is not dependent on the crossover frequency of the error signal loop whereas traditional voltage mode and current mode methods are dependent on the compensation of the error signal loop.

The $V^{2TM}$ error signal loop can have a low crossover frequency, since transient response is handled by the ramp signal loop. The "slow" error signal loop provides DC accuracy. Low frequency roll-off of the error amplifier bandwidth will significantly improve noise immunity. This also improves remote sensing of the output voltage, since switching noise picked up in long feedback traces can be effectively filtered.

$V^{2TM}$ line regulation and load regulation are improved because there are two separate control loops. A voltage mode controller relies on a change in the error signal to indicate a change in the line and/or load conditions. The error signal change causes the error loop to respond with a correction that is dependent on the gain of the error amplifier. A current-mode controller has a constant error signal during line transients, since the slope of the ramp signal will change in this case. However, regulation of load transients still requires a change in the error signal. $V^{2TM}$ control maintains a fixed error signal for both line and load variation, since the ramp signal is affected by both.

SUMMARY OF THE INVENTION

One embodiment of the present invention includes a novel gate drive circuit for a switching power supply. The power supply has an output inductor connected at one end to a power switch circuit having a duty cycle, the other end of the output inductor having a regulated output voltage. The gate drive circuit includes an error amplifier that produces an error signal representative of the difference between a reference voltage and a voltage feedback signal representative of the regulated output voltage. A pulse width modulator comparator that compares the error signal to a composite signal representing a summing of the voltage feedback signal with a current sensing signal representative of output inductor current, the composite signal having an ac component and a dc component, the comparator output resulting in a gate drive signal that controls the duty cycle of the power switch circuit to maintain the regulated output voltage.

In a further such embodiment, an adaptive voltage positioning circuit adjusts the voltage feedback signal to increase the regulated output voltage above a nominal output voltage when the output inductor current is less than a nominal current, and to decrease the regulated output voltage below the nominal output voltage when the output inductor current is more than the nominal current. The adaptive voltage positioning circuit may use a resistance network, and/or, control output impedance of the power switch circuit based on scaling of the current sensing signal.

An embodiment may further include an overcurrent protection circuit that causes the comparator to turn off the power switch circuit when the current sensing signal exceeds a maximum current reference voltage. The comparator output may determine when the gate drive signal turns off the power switch circuit, in which case, a constant frequency oscillator signal may determine when the gate drive signal turns on the power switch circuit.

Another embodiment of the present invention includes a novel method of generating a gate drive signal for a switching power supply, the power supply having an output inductor connected at one end to a power switch circuit having a duty cycle, the other end of the output inductor having a regulated output voltage, The method includes producing an error signal representative of the difference between a reference voltage and a voltage feedback signal representative of the regulated output voltage; and comparing the error signal to a composite signal representing a summing of the voltage feedback signal with a current sensing signal representative of output inductor current, the composite signal having an ac component and a dc component, to produce a signal for generating a gate drive signal that controls the duty cycle of the power switch circuit to maintain the regulated output voltage.

A further such embodiment, may also include adjusting the voltage feedback signal to increase the regulated output voltage above a nominal output voltage when the output inductor current is less than a nominal current, and to decrease the regulated output voltage below the nominal output voltage when the output inductor current is more than the nominal current. Adjusting the voltage feedback signal may include using a resistance network, and/or, use scaling of the current sensing signal to control output impedance of the power switch circuit.

An embodiment may further include providing overcurrent protection by causing the gate drive signal to turn off the power switch circuit when the current sensing signal exceeds a maximum current reference voltage. The signal produced by comparing may determine when the gate drive signal turns off the power switch circuit, in which case, the gate drive signal may turn on the power switch circuit according to a constant frequency oscillator signal.

Another embodiment of the present invention includes a multi-phase gate drive circuit for a switching power supply, the power supply having a plurality of parallel output inductors, each inductor being connected at one end to an associated power switch circuit having a duty cycle, the other end of each inductor being connected to an electrically common point having a regulated output voltage. The gate drive circuit includes an error amplifier circuit that produces an error signal representative of the difference between a reference voltage and a voltage feedback signal representative of the regulated output voltage; and a pulse width modulator comparator for each power switch circuit, each comparator comparing the error signal to a composite signal representing a summing of the voltage feedback signal with a current sensing signal representative of current of the associated output inductor, the composite signal having an ac component and a dc component, each comparator producing a signal for generating a gate drive signal that controls the duty cycle of the associated power switch circuit to maintain the regulated output voltage.

Such an embodiment may further include an adaptive voltage positioning circuit that adjusts the voltage feedback signal to increase the regulated output voltage above a nominal output voltage when output current is less than a nominal current, and to decrease the regulated output voltage below the nominal output voltage when output current is more than the nominal current. The adaptive positioning circuit may use a resistance network, and/or, control output impedance of the associated power switch module based on scaling of the associated current sensing signal.

In a further embodiment, each of the plurality of parallel output inductors may be limited to the same peak current based on output impedance of the associated power switch circuit. An overcurrent protection circuit may cause a comparator to turn off its associated power switch circuit when the associated current sensing signal exceeds a maximum current reference voltage. A current limiting circuit may cause each comparator to turn off its associated power switch circuit when a signal representing a sum of the average current of each power switch circuit exceeds an overcurrent reference signal. The signal produced by each comparator may determine when the associated gate drive signal turns off its associated power switch circuit, in which case, a constant frequency oscillator signal may determine when each gate drive signal turns on its associated power switch circuit.

An embodiment of the present invention includes a switching power supply for producing a regulated output voltage. The power supply includes an output inductor connected at one end to a power switch circuit having a duty cycle, the other end of the output inductor having a regulated output voltage. A voltage feedback circuit voltage feedback circuit coupled to the other end of the output inductor produces a voltage feedback signal representative of the regulated output voltage. A current feedback circuit coupled to both ends of the output inductor produces a composite signal representing a summing of the voltage feedback signal with a current sensing signal representative of output inductor current, the composite signal having an ac component and a dc component. An error amplifier produces an error signal representative of the difference between a reference voltage and the voltage feedback signal. A pulse width modulator comparator compares the error signal to the composite signal, the comparator output resulting in a gate drive signal that controls the duty cycle of the power switch circuit to maintain the regulated output voltage.

In a further embodiment, the current feedback circuit may include an RC filter, or a voltage divider. The power switch circuit may further include two semiconductor switches connected in series to form a common terminal connected to the output inductor. An adaptive voltage positioning circuit may adjusts the voltage feedback signal to increase the regulated output voltage above a nominal output voltage when the output inductor current is less than a nominal current, and to decrease the regulated output voltage below the nominal output voltage when the output inductor current is more than the nominal current. The adaptive voltage positioning circuit may use a resistance network, and/or, control output impedance of the power switch circuit based on scaling of the current sensing signal.

A further embodiment may include an overcurrent protection circuit that causes the comparator to turn off the power switch circuit when the current sensing signal exceeds a maximum current reference voltage. The comparator output may determine when the gate drive signal turns off the power switch circuit, in which case, a constant frequency oscillator signal may determine when the gate drive signal turns on the power switch circuit.

An embodiment of the present invention includes a multi-phase switching power supply for producing a regulated output voltage. The power supply includes a plurality of output inductors connected in parallel, each inductor being connected at one end to an associated power switch circuit having a duty cycle, the other end of each inductor being connected to an electrically common point having a regulated output voltage. A voltage feedback circuit coupled to the electrically common point that produces a voltage feedback signal representative of the regulated output voltage. A current feedback circuit for each output inductor, coupled to both ends of each respective inductor, that produces a composite signal representing a summing of the voltage feedback signal with a current sensing signal representative of current of the associated output inductor, the composite signal having an ac component and a dc component. A pulse width modulator comparator for each power switch circuit compares the error signal to the associated composite signal to produce a signal for generating a gate drive signal that controls the duty cycle of the associated power switch circuit to maintain the regulated output voltage.

In a further embodiment, the current feedback circuit includes, for each output inductor, an RC filter, or a voltage divider. Each power switch circuit may include two semiconductor switches connected in series to form a common terminal connected to the associated output inductor. In addition, an adaptive voltage positioning circuit may adjust the voltage feedback signal to increase the regulated output voltage above a nominal output voltage when output current is less than a nominal current, and to decrease the regulated output voltage below the nominal output voltage when output current is more than the nominal current. The adaptive voltage positioning circuit may uses a resistance network, and/or, control output impedance of a power switch module based on scaling of the associated current sensing signal.

An embodiment may also include an overcurrent protection circuit that causes a comparator to turn off its associated power switch circuit when the associated current sensing signal exceeds a maximum current reference voltage. A current limiting circuit may cause each comparator to turn off its associated power switch circuit when a signal representing a sum of the average current of each power switch circuit exceeds an overcurrent reference signal. The comparator output may determine when the gate drive signal turns off its associated power switch circuit, in which case, a constant frequency oscillator signal may determine when the gate drive signal turns on its associated power switch circuit.

BRIEF DESCRIPTION OF THE DRAWINGS

The present invention will be more readily understood by reference to the following detailed description taken with the accompanying drawings, in which.

DETAILED DESCRIPTION OF SPECIFIC EMBODIMENTS

A preferred embodiment of the present invention includes a three-phase, fixed frequency, enhanced V²™ architecture buck converter controller with an adaptive voltage positioning circuit for improved transient current response. Each phase is delayed from the previous phase by a programmable time period. In a synchronous buck converter, the high side gate signal normally transitions high at the beginning of each oscillator cycle. Inductor current ramps up until the combination of the current sense signal and the output voltage ripple trip the PWM comparator and bring the high side gate signal low. (Normally, the current sense signal is designed to dominate during steady state operation.) Once the high side gate signal goes low, it remains low until the beginning of the next oscillator cycle. While the high side gate signal is high, the enhanced V²™ loop will respond to line and load transients. Once the high side gate signal is low, the loop will not respond again until the beginning of the next cycle.

Thus, the response of any phase to a positive step in load current can be delayed by up to one switching cycle. The response to a negative step in load current is immediate.

Figure 1:
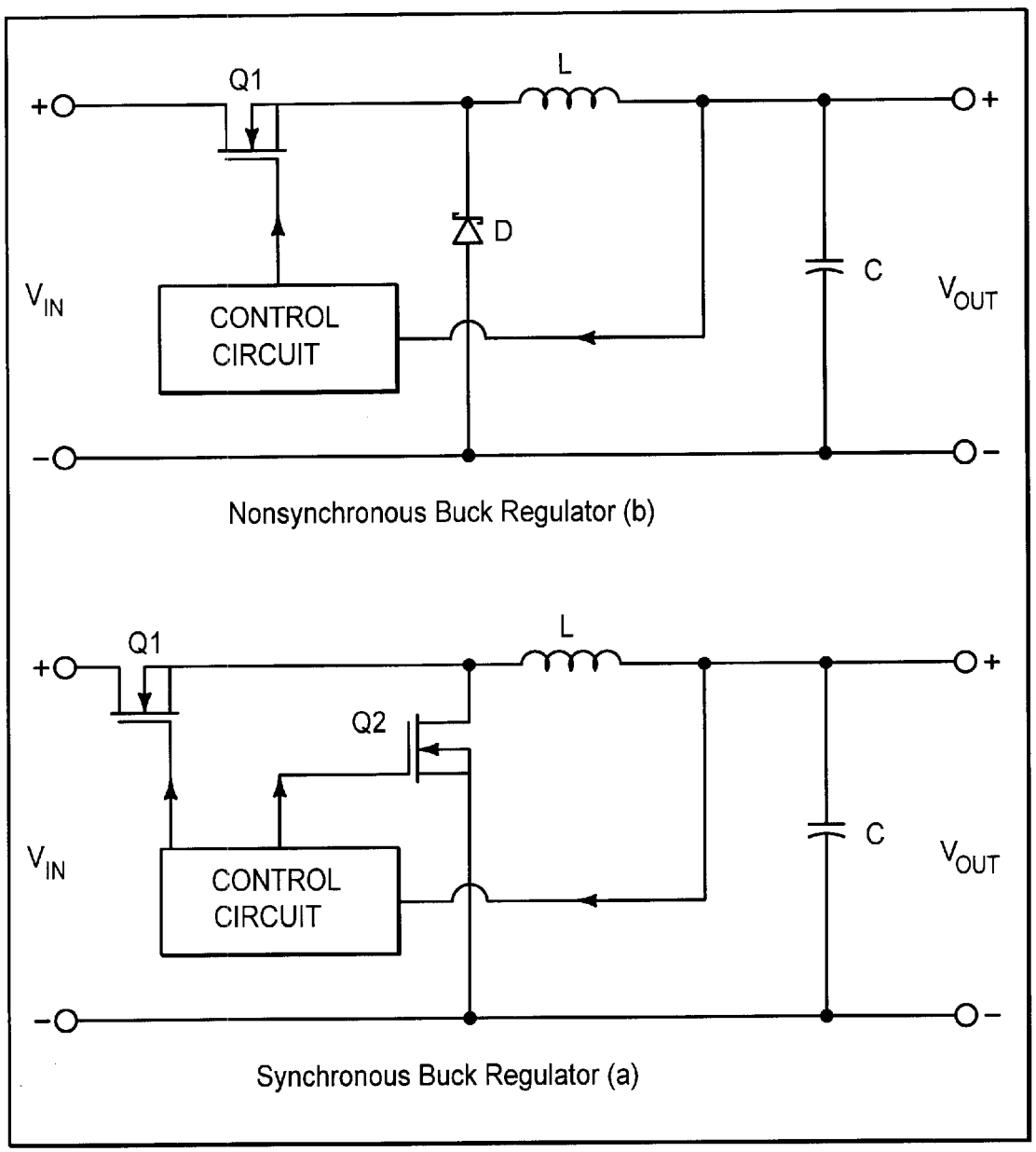
FIGS. 1 (a)–(b) illustrates simple synchronous and non-synchronous buck converters.
Figure 2:
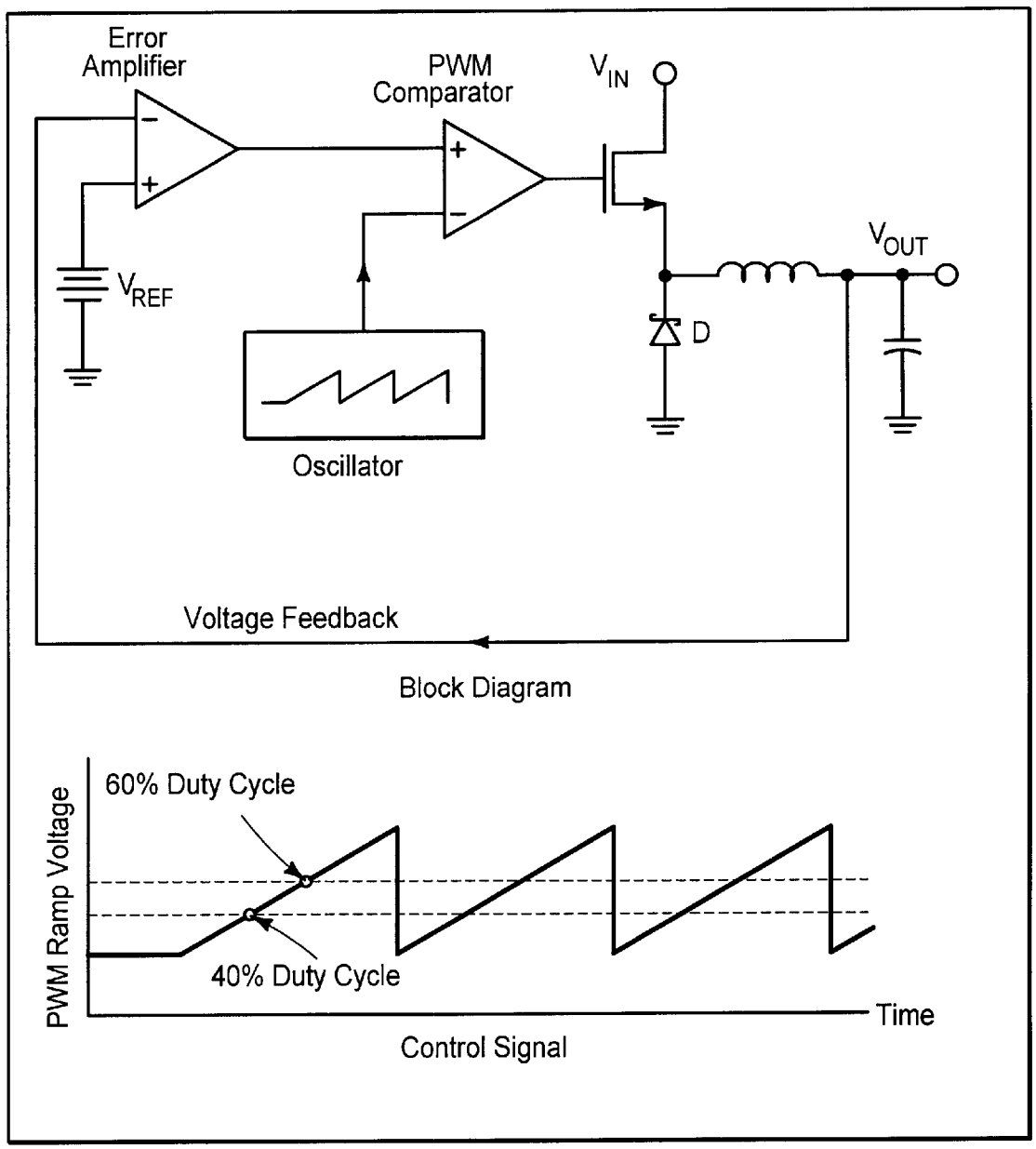
FIG. 2 illustrates voltage mode control of a buck converter.
Figure 3:
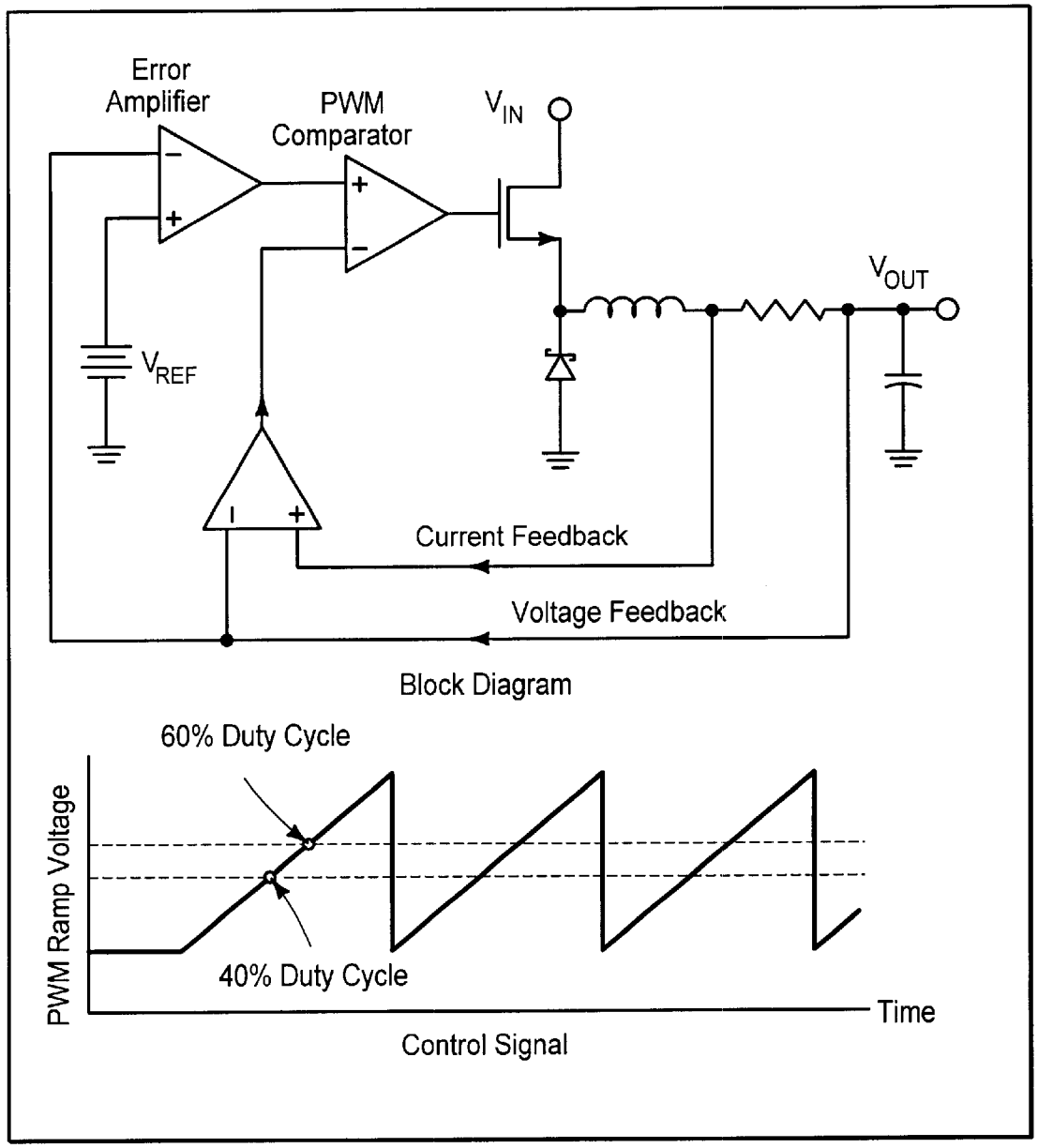
FIG. 3 illustrates current mode control of a buck converter.
Figure 4:
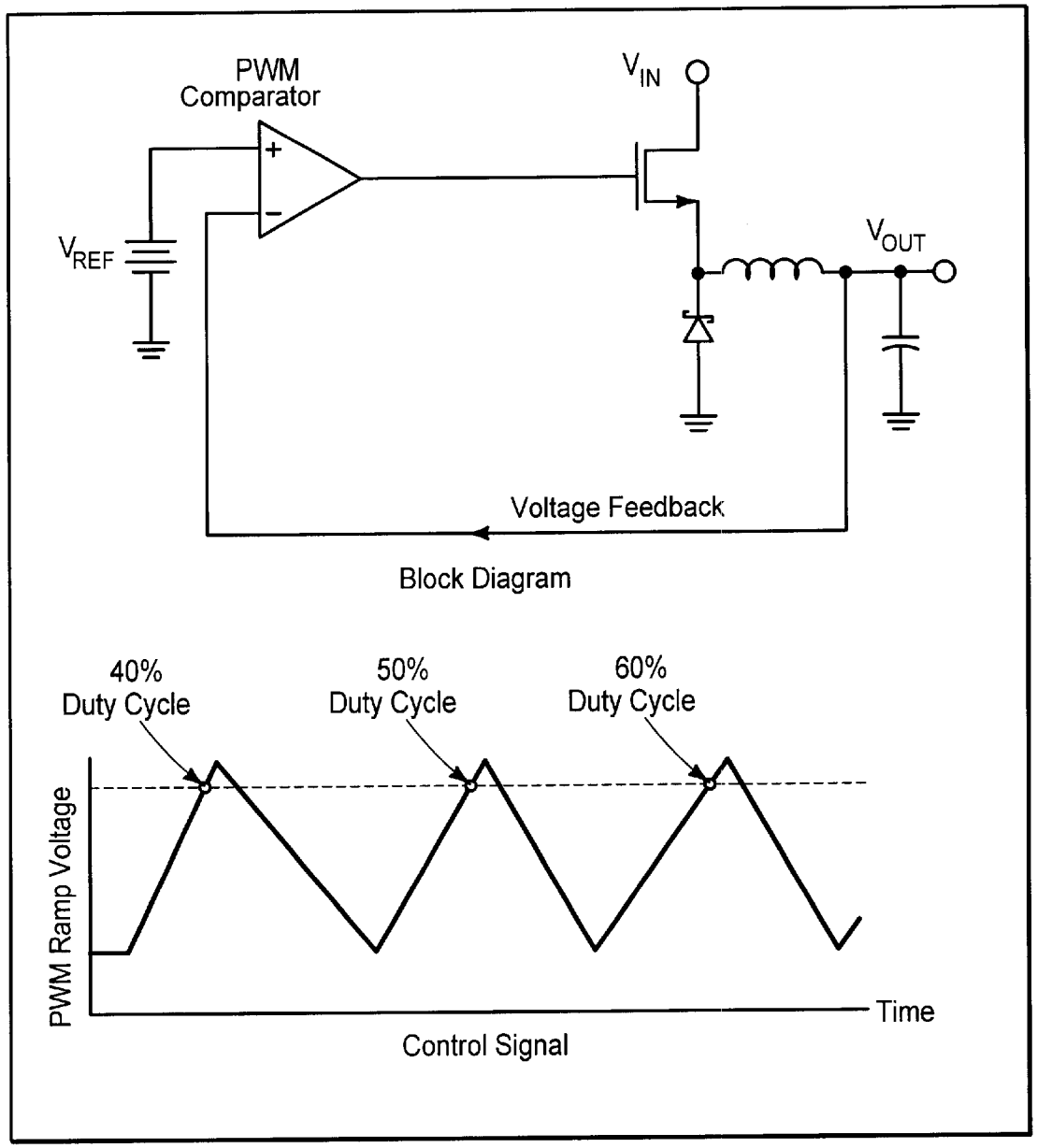
FIG. 4 illustrates ripple regulation control of a buck converter.
Figure 5:
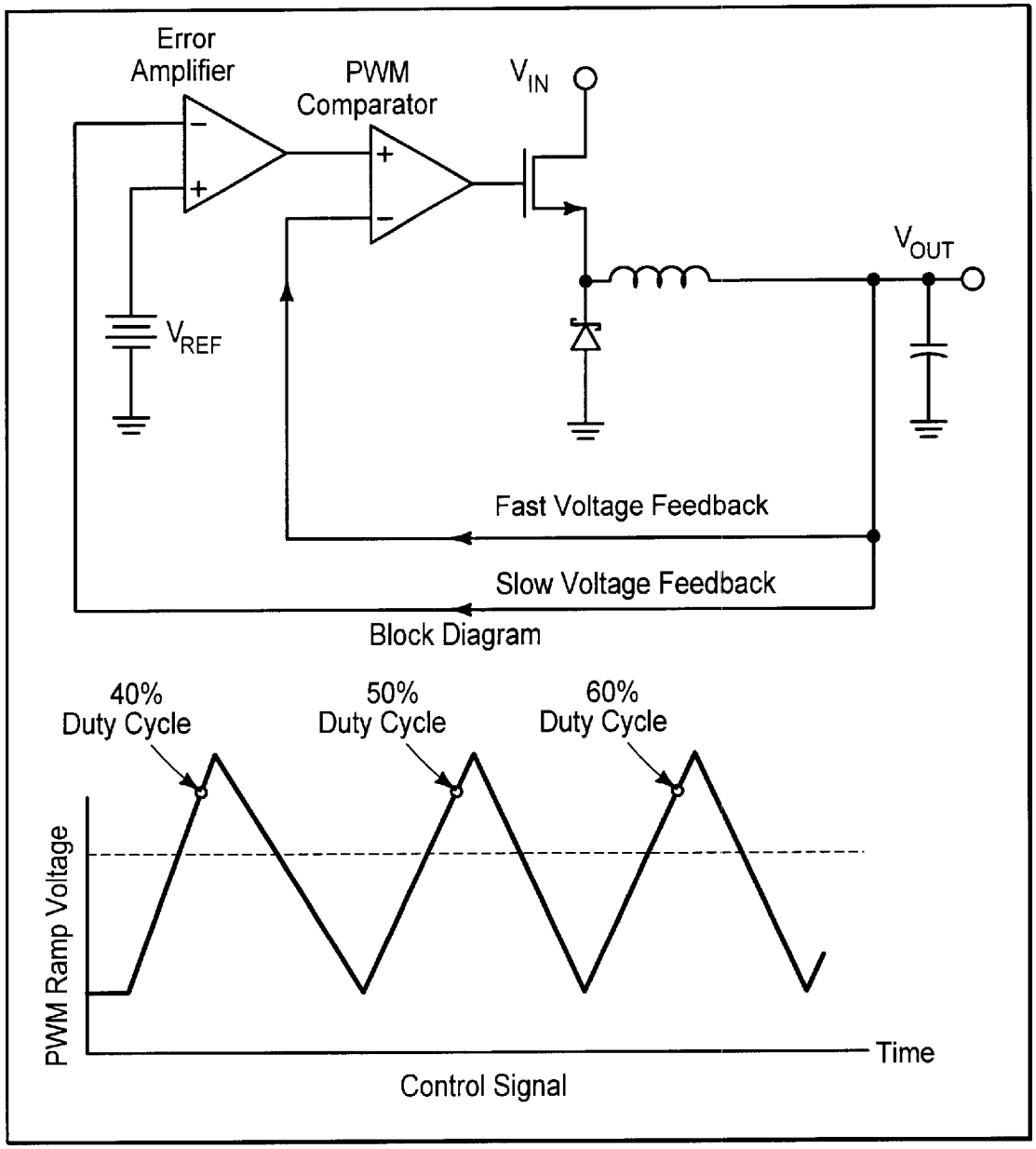
FIG. 5 illustrates V²™ mode control of a buck converter.
Figure 6:
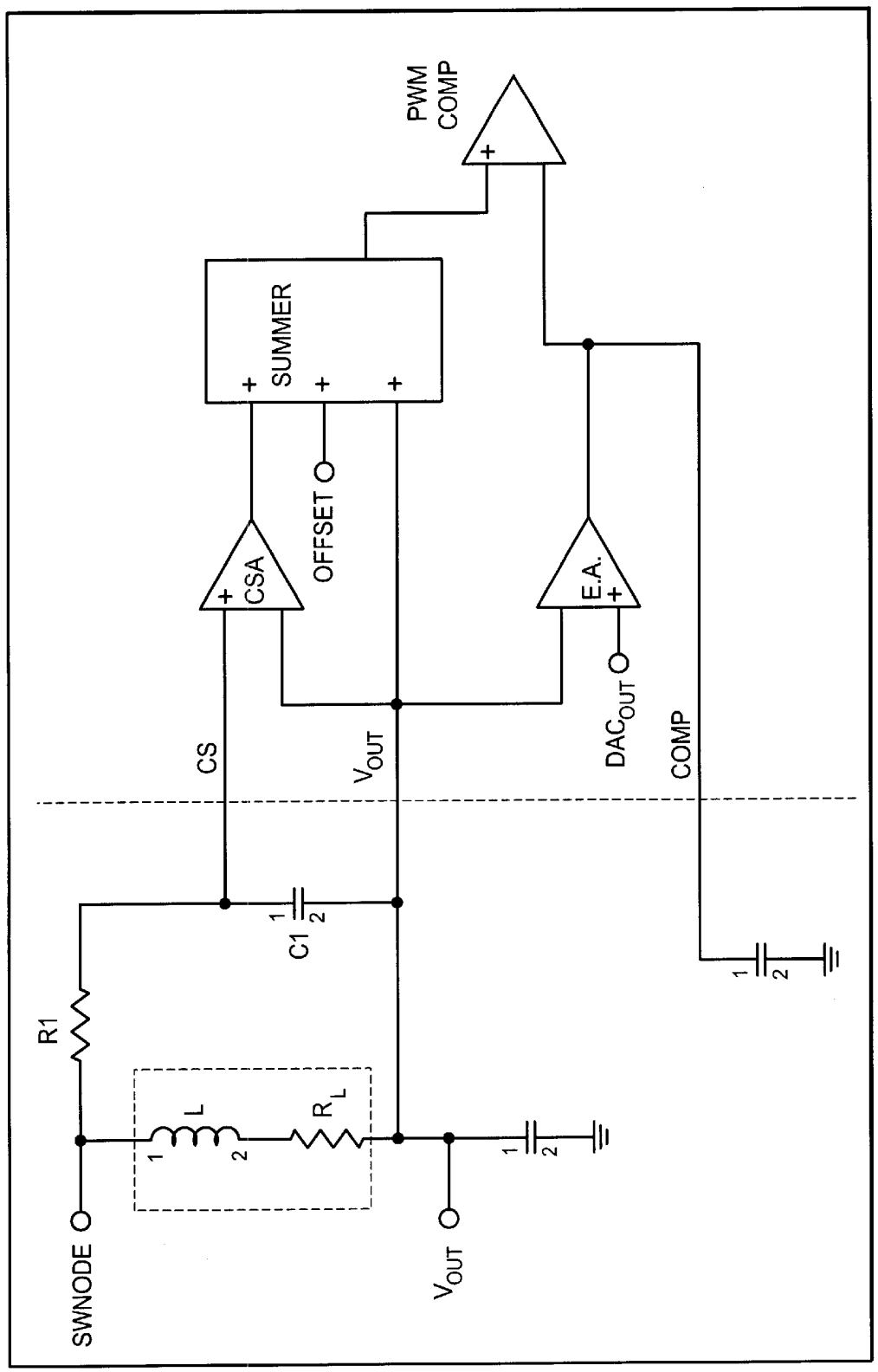
FIG. 6 illustrates the voltage feedback and current feedback configuration in a single phase embodiment.

FIG. 6 illustrates the voltage feedback and current feedback configuration in a single phase embodiment. In a multi-phase embodiment, the current of each individual phase is sensed, and an additional input is added to the enhanced V²™ loop for each phase. In FIG. 6, L is the buck inductance, and $R_L$ is the parasitic resistance of the buck inductor. If the values of R1 and C1 are chosen so that $L/R_L$=R1*C1, then the voltage signal CS will represent the instantaneous value of inductor current. If a more accurate current sense is required, current can be sensed through a resistor instead of across the inductor. The embodiment shown in FIG. 6 represents an enhancement of the original V²™ architecture which used the regulated output voltage for both a fast feedback signal and a slow feedback signal. Like a traditional current sensing regulator, a current feedback loop is used, but unlike traditional current mode sensing, the current feedback signal is a composite signal including an ac component representing inductor current and a dc component representing output voltage. As a result, changes in output current are sensed without delay and the regulator circuit as a whole reacts more quickly. In a multi-phase version of the simplified circuit shown in FIG. 6, as current increases the voltage on the positive pin of the PWM Comparator rises and tends to terminate the PWM cycle earlier, providing negative feedback for each phase. As long as each phase is working from the same COMP and feedback pin there will be current sharing.

For applications with fast transient currents, the output filter is often larger than required to handle output ripple, in order to reduce voltage excursions during load current transients. Adaptive voltage positioning (AVP) can reduce peak-peak output voltage deviations during load transients and allow for a smaller output filter. The output voltage is set higher than nominal at light loads to reduce output voltage sag when the load current is stepped up, and set lower than nominal at heavy loads to reduce overshoot when the load current is stepped down.

Figure 7:
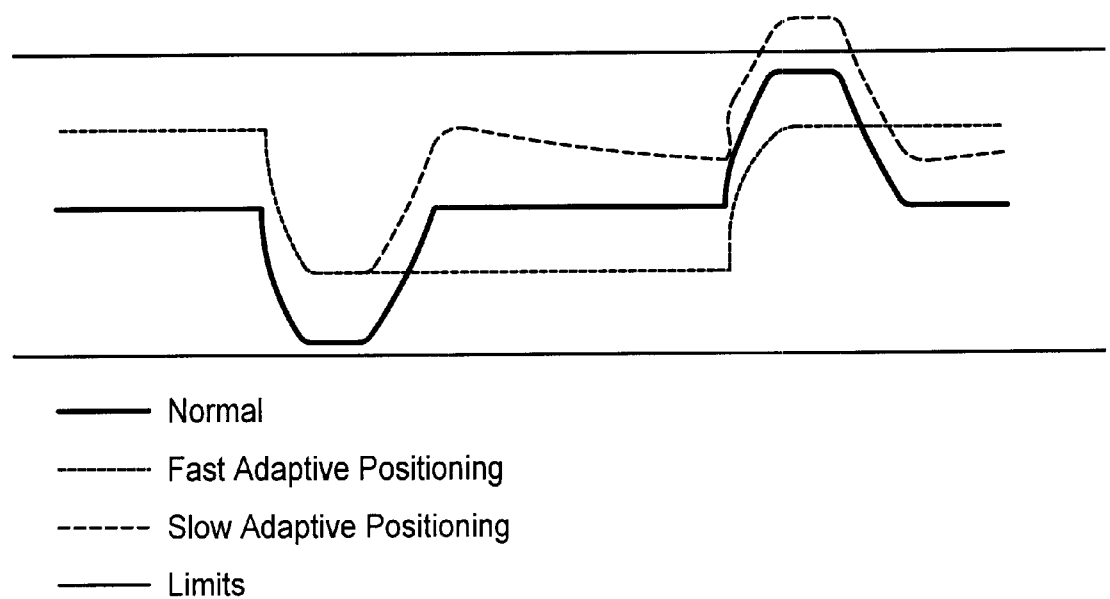
FIG. 7 illustrates how adaptive positioning works.

FIG. 7 illustrates how adaptive positioning works. The waveform labeled normal shows output voltage for a converter without adaptive positioning. On the left, output voltage sags when the output current is stepped up, and later overshoots when current is stepped back down. With fast (ideal) adaptive positioning, the peak to peak excursions are cut in half. In the slow adaptive positioning waveform, the output voltage is not repositioned quickly enough after current is stepped up and the upper limit is exceeded.

For low current applications, a droop resistor can provide fast accurate adaptive positioning. However, at high currents, the loss in a droop resistor becomes excessive. For example, in a 50 A converter a 1 mW resistor to provide a 50 mV change in output voltage between no load and full load would dissipate 2.5 Watts. Lossless adaptive positioning is an alternative to using a droop resistor, but the circuit must respond quickly to changes in load current.

Figure 8:
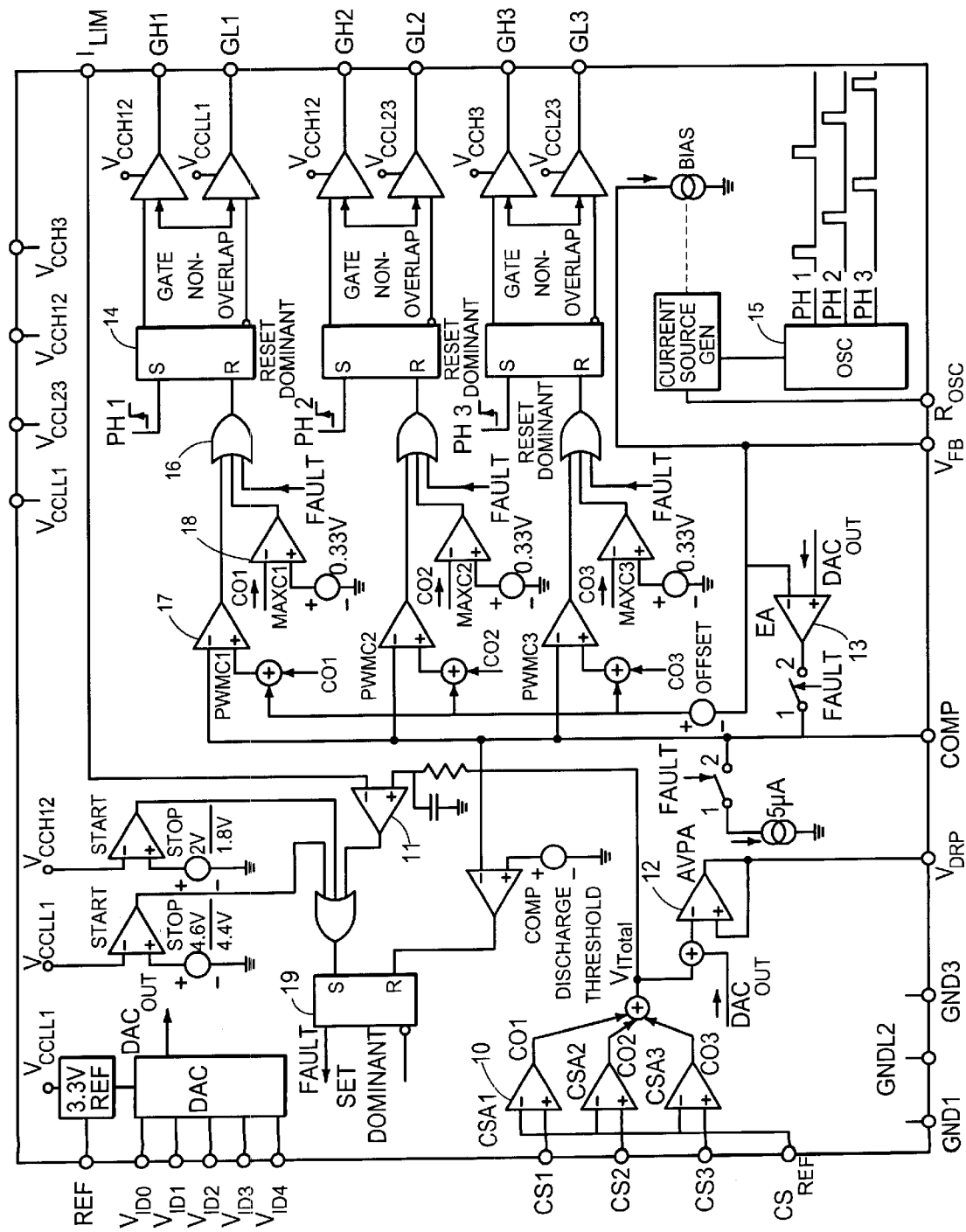
FIG. 8 illustrates a preferred embodiment integrated circuit chip which operates as a multi-phase buck CPU controller.
Figure 9:
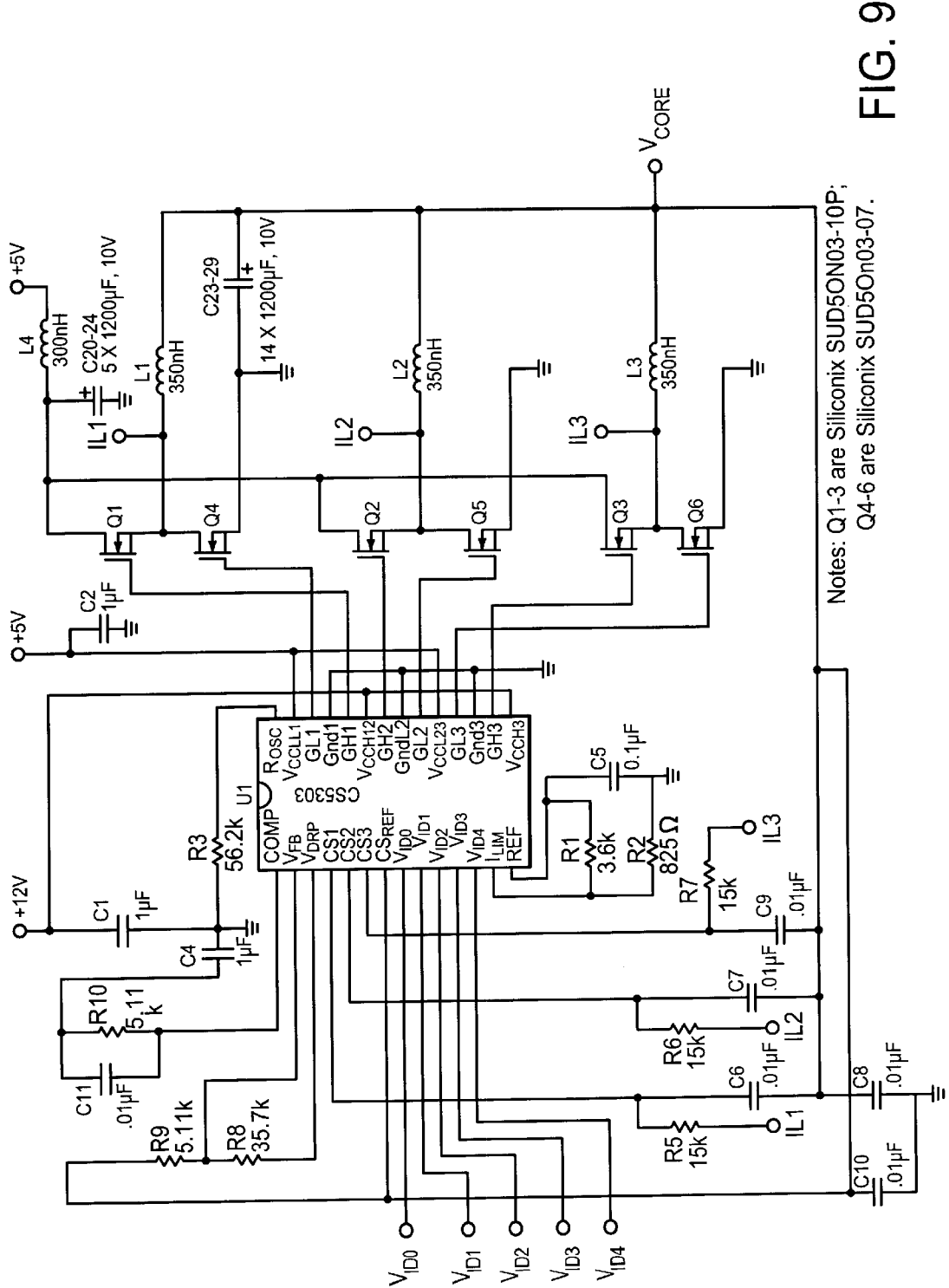
FIG. 9 shows a typical application circuit employing the IC of FIG. 8 for a three-phase buck-configured step-down voltage regulator.

FIG. 8 illustrates an integrated circuit chip which operates as a multi-phase buck CPU controller according to a preferred embodiment. FIG. 9 shows a typical application circuit employing the IC of FIG. 8 for a three-phase buck-configured step-down voltage regulator. As shown in FIG. 9, each output phase uses dual synchronous n-channel MOSFETs Q1–Q6 to drive an output inductor L1–L3 which all share an electrically common output side that supplies current to a load having an output voltage $V_{CORE}$. The upstream side of each output inductor is sensed at IL1, IL2, and IL3 and developed by respective compensation networks R5/C6, R6/C7, and R7/C9. The compensation network reduces, but does not eliminate, the ac and dc components of the signal, and leaves a composite ac and dc signal representing the output current being supplied by the associated output inductor, L1–L3; in other words, a current feedback signal. Specifically, one side of each series RC capacitor, C6, C7, and C9, is connected to the output voltage $V_{CORE}$ while the other side of each capacitor which is connected to an associated compensation resistor, R5, R6, and R7, and supplies the composite signal representing the associated output inductor current, thereby creating composite current sensing signals CS1–CS3 inputs to the IC chip U1 in FIG. 9.

Within the IC chip itself, as shown in FIG. 8, each current sensing signal CS1–CS3 is applied to the non-inverting input of current sensing instrumentation amplifier 10 CSA1–3. The $CS_{REF}$ signal to the inverting input of each current sensing instrumentation amplifier (CSA1–3) 10, acts as a current sensing reference signal and is equivalent to the regulated output voltage $V_{CORE}$ (see FIG. 9). The output of each current sensing instrumentation amplifier 10 is a current offset signal CO1–CO3. The current offset signals CO1–CO3 are used in the pulse width modulation (PWM) circuitry, and also are summed together to generate a total average current signal $V_{ITOTAL}$ which is used in the overcurrent limit comparator 11.

The total average current signal $V_{ITOTAL}$ is also summed with the voltage setting reference $DAC_{OUT}$ and input to the adaptive voltage positioning amplifier (AVPA) 12. The AVP offset voltage $V_{DRP}$ output from the AVP amp 12 is connected, via a resistor external to the chip, to the $V_{FB}$ signal line to set the amount of AVP desired in a specific application. The offset of $V_{DRP}$ above the DAC voltage is proportional to load current. The voltage feedback signal line $V_{FB}$ input to the chip is integrated with the AVP circuitry. A resistor connected between $V_{FB}$ and $V_{CORE}$ sets the AVP offset for light load currents. The input current of the $V_{FB}$ pin and the resistor value selected determine output voltage offset for zero output current. The $V_{FB}$ signal is used in the PWM circuitry, and also is compared with $DAC_{OUT}$ by the error amplifier (EA) 13 to produce the error amplifier output COMP, which is also used in the PWM circuitry.

The PWM circuit determines the actual timing and maximum duration of the gate drive signals to control the duty cycle of the each pair of the synchronous buck drivers Q1–Q6 in the application circuit, as shown in FIG. 9. For each phase, a PWM latch 14 generates the gate drive signals for MOSFET switches Q1–Q6. The non-inverting output of the PWM latch 14 turns on its associated high side driver Q1–Q3 when the set input receives an oscillator output pulse PH1–3 from the phase-sequenced oscillator (OSC) 15. The inverting output of the PWM latch 14 turns off the associated high side driver Q1–Q3 and turns on the associated low side driver Q4–Q6 when the reset input receives an input pulse from the associated PWM OR-gate 16. During normal operation, each PWM OR-gate 16 is controlled by its associated PWM comparator 17. The inverting input of each PWM comparator 17 is the COMP from the error amplifier 13; in essence, a relatively "slow" dc feedback signal that maintains high dc accuracy in the enhanced $V^2$ architecture of a preferred embodiment. The non-inverting input to each PWM comparator 17 is the sum of the respective current sensing signal CO1–CO3 with an +0.5 v offset feedback voltage $V_{FB}$.; in essence, a relatively "fast" ac current ramp signal representing instantaneous output inductor current.

A preferred embodiment provides two levels of overcurrent protection. Whenever the voltage on a Current Sense pin (CS1–3) exceeds $CS_{REF}$ by more than a single phase pulse by pulse current limit, the max current comparator 18 turns off the associated high side driver Q1–Q3 via the PWM OR-gate 16 and the reset input of the PWM latch 14. This provides fast peak current protection for individual phases. The outputs of all currents are also summed and filtered to form an averaged current signal $V_{ITOTAL}$ which is compared to the voltage on the current limiting threshold pin $I_{LIM}$ by the overcurrent limit comparator 11. If the $I_{LIM}$ voltage is exceeded, the overcurrent fault latch 19 trips. This turns off the associated high side driver Q1–Q3 via the PWM OR-gate 16 and the reset input of the PWM latch 14. In addition, the COMP capacitor is discharged by a 5 $\mu$A source until the COMP pin reaches 0.2 v. Then, a soft-start begins and the converter will continue to operate in this mode until the fault condition is corrected.

A preferred embodiment uses two methods to provide fast and accurate adaptive voltage positioning (AVP). For low frequency positioning, the $V_{FB}$ and $V_{DRP}$ pins are used to adjust the output voltage with varying load currents. For high frequency positioning, the current sense input pins (CS1–3) can be used to control the power stage output impedance. The transition between fast and slow positioning is adjusted by the COMP pin.

For low frequency adaptive positioning, the input bias current of the $V_{FB}$ pin and the $V_{DRP}$ output can be used to provide output voltage adjustment based on the output current of the converter. The output voltage can be set higher than nominal at light output loads by connecting a properly selected resistor between the output and $V_{FB}$. The output can be set lower during heavy loads by connecting a properly selected resistor between $V_{DRP}$ and $V_{FB}$. The output of the $V_{DRP}$ pin equals $DAC_{OUT}$+(Current Sense to $V_{DRP}$Gain*$\Sigma$ (CSx–$CS_{REF}$)). The speed at which this pin responds is related to the time constant formed by the output filter and the converter output impedance and current sense networks. Once the time constants of the output filter and current sense elements have settled, the difference between $V_{DRP}$ output and $DAC_{OUT}$ are proportional to the output current.

F or high frequency adaptive positioning, the response within the first $\mu$sec after a transient typically will be determined by the output filter equivalent series resistance (ESR) and equivalent series inductance (ESL). During the next several $\mu$sec after a transient, the output impedance of the converter can be controlled using the current sense network and compensation of the error amplifier 13. Because the current sense signal is added to the voltage signal at the PWM comparator 17 the output impedance of the converter can be adjusted by changing the scaling of the current signal.

Figure 10:
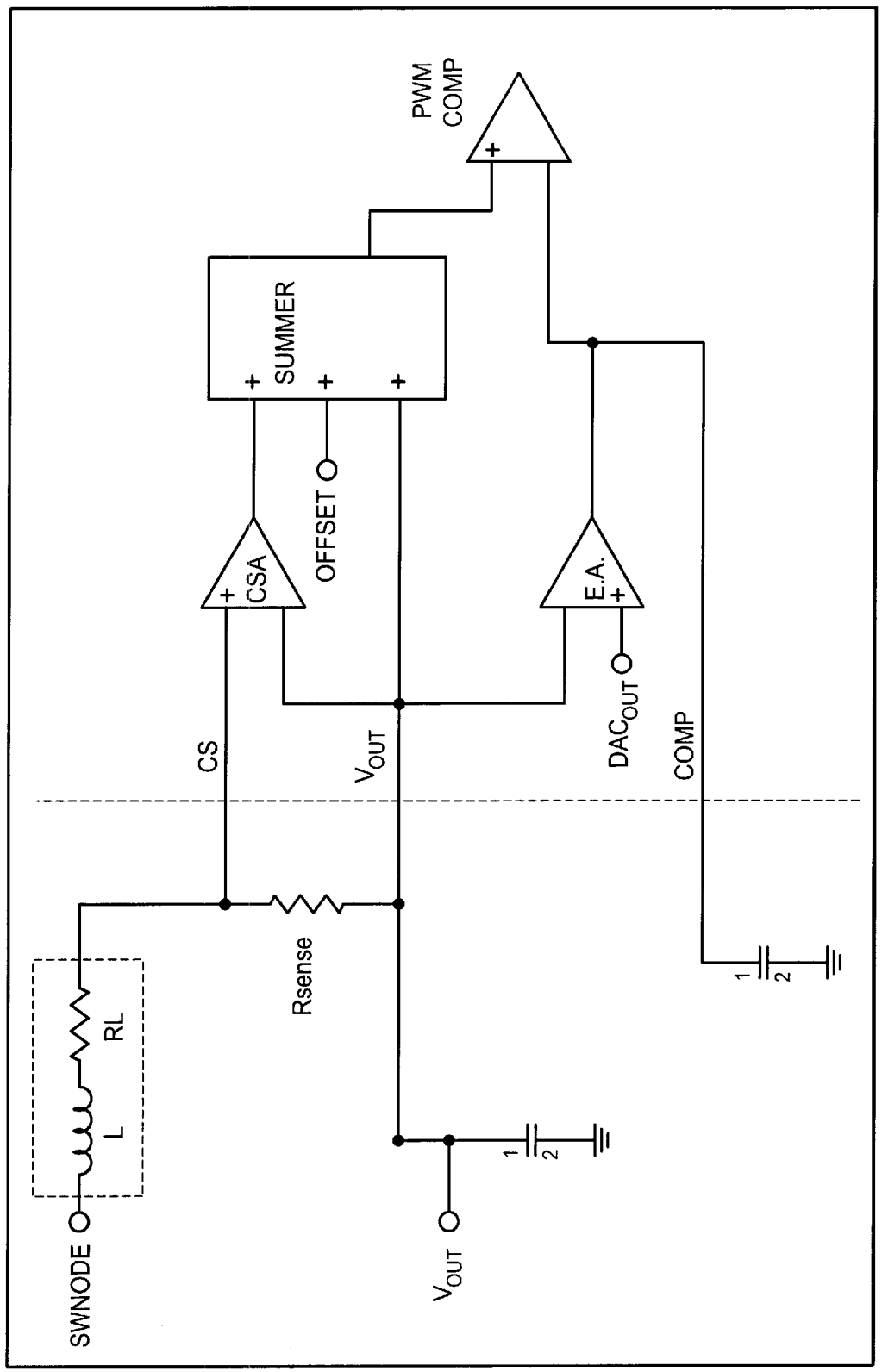
FIG. 10 is an alternate version of the circuit of FIG. 6 in which a resistive sensing arrangement is used to sense output current.
Figure 11:
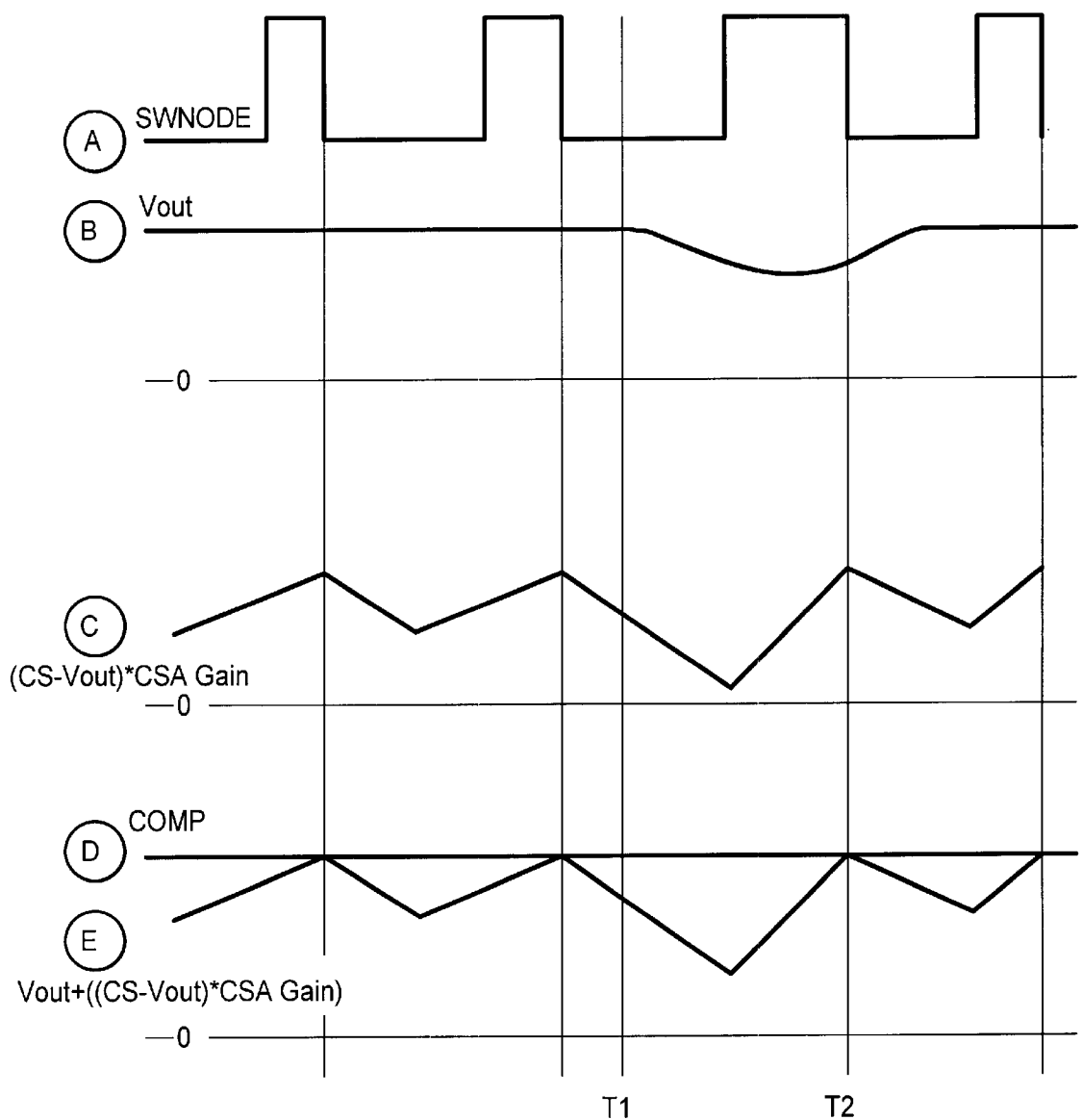
FIG. 11 illustrates a current transient showing various signal waveforms in the circuits of FIG. 6 and FIG. 10.

FIG. 11 illustrates a current transient showing various signal waveforms in the circuits of FIG. 6 and FIG. 10, with the horizontal axis being time. For simplified analysis, we assume that in FIG. 6, OFFSET is zero. Waveform A, labeled SWNODE, shows the on/off switching of the power switch circuit. Waveform B, labeled Vout, shows the regulated output voltage. Waveform C, labeled (CS–Vout)*CSA Gain, shows the current feedback signal from the current sensing amp, CSA. Waveform D, labeled COMP, represents the output of the error amp, EA, which is the difference between the voltage feedback signal (Vout itself in this case) and a reference voltage, DAC OUT. Waveform E, labeled Vout+(CS–Vout)*CSA Gain, is the summer output—a composite waveform having and ac component, (CS–Vout) *CSA Gain, riding on top of a dc component, Vout (or, in other words, Waveform B +Waveform C).

With respect to simplified FIG. 6 and waveform FIG. 11, each PWM cycle is terminated, as shown by Waveform A, when the summer output Waveform E exceeds the COMP voltage Waveform D. If load current steps up, as occurs at time T1, and output voltage sags (as shown in Waveform B), the PWM on-time will continue until the current sensing signal Waveform C increases enough to make up for the loss in voltage, at time T2.

If ideal compensation of the current sense network is assumed, the output impedance of a 3 phase power stage with a 1 mΩ inductor resistance (or a 1 mΩ sense resistor) will be:

$$R_{POWER\ STAGE} = R_L * CSA\ Gain/\#\ of\ Phases = 1\ m\Omega * 3.7/3 = 1.2\ m\Omega.$$

Initially this impedance appears in parallel with the output filter ESR. If the power stage was run open loop the (with the COMP pin held in one place) the output filter would discharge with a time constant of $(R_{POWER\ STAGE} + ESR_{FILTER})*C_{FILTER}$ until the entire output resistance would appear to be $R_{POWER\ STAGE}$.

FIG. 10 is an alternate version of the simplified circuit of FIG. 6 in which a resistive current sensing network is used. If the COMP pin is held steady for a given change in output voltage, there will be a corresponding opposite change in the current sensing signal (CSA output). This change in the current signal reflects a change in peak inductor current. Ultimately, the output impedance of the converter (SWNODE) will be:

$$Z_{OUT} = \frac{\Delta V_{OUT}}{\Delta I_{OUT}} = \frac{\Delta V_{OUT}}{\Delta I_L}$$

And, $\Delta V_{OUT} = \Delta CSA_{OUT}$ because the current sensing amplifier CSA output changes the same magnitude as $V_{OUT}$. Thus:

$$Z_{OUT} = \frac{\Delta CSA_{OUT}}{\Delta I_L} = \frac{\Delta I_L \times R_{SENSE} \times CSA_{GAIN}}{\Delta I_L}$$

Again assuming that OFFSET is zero (or at least ignored for simplified analysis), then, $$I_{OUT(per\_phase\_peak)} = \frac{COMP - V_{OUT}}{Z_{OUT}}$$

Thus, in a multi-phase system in which each phase shares the same COMP and $V_{OUT}$ ($V_{FB}$) pins, and assuming same value $R_{SENSE}$ and CSA gain, all the phases will have the same peak inductor current.

There is a transition between the effects of high frequency and low frequency adaptive positioning. The COMP network component values should be chosen to smooth this transition and can be done empirically. If the COMP network impedance is too low, the RC time constant of the output filter will be visible in the transient response and the output will continue to sag or overshoot until the slow adaptive positioning takes over. If the value is too high the output will drift back to the previous level until the slow adaptive positioning takes over.

Although various exemplary embodiments of the invention have been disclosed, it should be apparent to those skilled in the art that various changes and modifications can be made that will achieve some of the advantages of the invention without departing from the true scope of the invention. These and other obvious modifications are intended to be covered by the appended claims.

What is claimed is:

1. In a power supply, a multi phase regulator controller providing a drive control signal in response to a composite feedback signal to regulate an output voltage of the power supply to a nominal voltage level, the regulator controller comprising:

an externally programmable adaptive positioning circuit coupled to receive a first portion of the composite feedback signal and having an output coupled to provide first and second bias signals; and a drive control circuit coupled to receive the output of the positioning circuit and having an output coupled to modify the drive control signal in response to the composite feedback signal to adjust the regulated output voltage above the nominal voltage level in response to the first bias signal and below the nominal voltage level in response to the second bias signal.

2. The regulator controller circuit of claim 1 wherein the programmable adaptive positioning circuit includes:

a current sense amplifier having a first input coupled to receive a current reference signal and a second input coupled to receive the first portion of the feedback signal;

an amplifier coupled to receive an output of the current sense amplifier and an output coupled to provide the second bias signal; and an externally programmable current source having an input coupled to receive a bias control signal and an output coupled to provide the first bias signal.

3. The regulator controller circuit of claim 1 wherein the drive control circuit includes:

a summing device coupled to receive the first portion and a second portion of the composite feedback signal and coupled to provide the composite feedback signal;

a comparator having a first input coupled to receive a reference signal indicative of the nominal voltage level and a second input coupled to receive the composite feedback signal;

a logic gate having a first input coupled to receive an output of the comparator and coupled to provide a drive termination signal; and a memory storage device having a first input coupled to receive a clock signal, a second input coupled to receive the drive termination signal and an output coupled to provide the drive control signal.

4. The regulator controller circuit of claim 3 wherein the logic gate is further coupled to receive second and third inputs used to initiate the drive termination signal.

5. The regulator controller circuit of claim 3 wherein the memory storage device includes a flip flop.

6. In a power supply, a regulation control circuit providing a drive signal in response to first and second feedback signals to provide a regulated output voltage of the power supply at a nominal voltage level, the regulation control circuit comprising:

an adaptive positioning circuit coupled to receive the first and second feedback signals and coupled to provide externally programmable first and second bias signals; and a drive circuit coupled to receive the first and second bias signals and coupled to modify the drive signal in response to the first and second feedback signals to adjust the regulated output voltage above the nominal voltage level in response to the first bias signal and below the nominal voltage level in response to the second bias signal.

7. The regulation control circuit of claim 6 wherein the adaptive positioning circuit includes:
an amplifier having a first input coupled to receive the first feedback signal and having a first output coupled to provide the second bias signal; and
an externally programmable current source having an input coupled to receive a bias control signal and an output coupled to provide the first bias signal.

8. The regulation control circuit of claim 6 wherein the drive circuit includes:
a summing device coupled to receive the first and second feedback signals and coupled to provide a composite feedback signal;
a comparator having a first input coupled to receive a reference signal indicative of the nominal voltage level and a second input coupled to receive the composite feedback signal;
a logic gate having a first input coupled to receive an output of the comparator and coupled to provide a drive termination signal; and
a memory storage device having a first input coupled to receive a clock signal, a second input coupled to receive the drive termination signal and an output coupled to provide the drive signal.

9. The regulator controller circuit of claim 8 wherein the logic gate is further coupled to receive second and third inputs used to initiate the drive termination signal.

10. The regulator controller circuit of claim 8 wherein the memory storage device includes a flip flop.

11. A regulation control circuit providing a drive signal in response to a modified feedback signal to regulate a nominal output voltage level, comprising:
an externally programmable adaptive positioning circuit coupled to receive a composite feedback signal and having an output coupled to provide the modified feedback signal; and
a control circuit having a first input coupled to receive the modified feedback signal and having an output coupled to modify the drive signal in response to the modified feedback signal to adaptively position the regulated output voltage with respect to the nominal output voltage level in response to an output current drive.

12. The regulation control circuit of claim 11 wherein the adaptive positioning circuit includes:
a current sense amplifier having a first input coupled to receive a current reference signal and a second input coupled to receive a first portion of the composite feedback signal;
an amplifier coupled to receive an output of the current sense amplifier and an output coupled to provide a first portion of the modified feedback signal; and
an externally programmable current source having an input coupled to receive a bias control signal and an output coupled to provide a second portion of the modified feedback signal.

13. The regulation control circuit of claim 11 wherein the control circuit includes:
a comparator having a first input coupled to receive a reference signal indicative of the nominal output voltage level and a second input coupled to receive the modified feedback signal;
a logic gate having a first input coupled to receive an output of the comparator and coupled to provide a drive termination signal; and
a memory storage device having a first input coupled to receive a clock signal, a second input coupled to receive the drive termination signal and an output coupled to provide the drive signal.

14. The regulator controller circuit of claim 13 wherein the logic gate is further coupled to receive second and third inputs used to initiate the drive termination signal.

15. The regulator controller circuit of claim 13 wherein the memory storage device includes a flip flop.

16. A method of controlling a multi phase power supply, comprising:
establishing an output power level of the power supply;
receiving a composite feedback signal in response to the output power level; and
modifying the composite feedback signal to adjust an output voltage level in response to an output current drive to reduce output transient signals.

17. The method of claim 16 wherein establishing an output drive level comprises providing a reference signal indicative of the output drive level.

18. The method of claim 16 wherein receiving a composite feedback signal comprises:
generating a current feedback signal indicative of output current drive;
generating a voltage feedback signal indicative of output voltage level; and
summing the current and voltage feedback signals.

19. The method of claim 16 wherein modifying the composite feedback signal includes:
applying a first bias signal to a first portion of the feedback signal;
applying a second bias signal to a second portion of the feedback signal; and
combining the first and the second portions of the feedback signal to create a modified composite feedback signal.

20. The method of claim 19 wherein applying the first bias signal includes generating the first bias signal across a first external resistor circuit.

21. The method of claim 19 wherein applying a second bias signal includes generating the second bias signal across a second external resistor circuit.

22. A method of controlling a multi phase power supply, comprising:
regulating a nominal output voltage level of the power supply;
providing a first output voltage level above the nominal voltage level in response to a minimum output current drive; and
providing a second output voltage level below the nominal voltage level in response to a maximum output current drive.

23. The method of claim 22 wherein regulating the nominal output voltage level includes:
providing a feedback signal indicative of an output voltage level;
comparing the feedback signal to a reference signal to create an error signal; and
modulating a pulse width of a drive signal to regulate the output voltage to a nominal value.

24. The method of claim 22 wherein providing the first output voltage level includes creating a bias signal with a fixed current source.

25. The method of claim 22 wherein providing the second output voltage level includes creating a bias signal with a current feedback signal indicative of output current drive.

* * * * *